(12) United States Patent
Hattenberger

(10) Patent No.: US 8,705,121 B2
(45) Date of Patent: Apr. 22, 2014

(54) TESTING PRINTER CALIBRATION

(75) Inventor: Edward Hattenberger, Firestone, CO (US)

(73) Assignee: Ricoh Production Print Solutions, Boulder, CO (US)

(*) Notice: Subject to any disclaimer, the term of this patent is extended or adjusted under 35 U.S.C. 154(b) by 694 days.

(21) Appl. No.: 12/895,118

(22) Filed: Sep. 30, 2010

(65) Prior Publication Data

US 2012/0081719 A1 Apr. 5, 2012

(51) Int. Cl.
*H04N 1/60* (2006.01)
*G06F 3/12* (2006.01)

(52) U.S. Cl.
USPC .............. 358/1.9; 358/406; 358/504; 702/85

(58) Field of Classification Search
USPC ......... 358/406, 504, 1.9; 702/1, 85, 127, 104; 399/49
See application file for complete search history.

(56) References Cited

U.S. PATENT DOCUMENTS

| | | | | |
|---|---|---|---|---|
| 5,243,546 | A | * | 9/1993 | Maggard ..................... 702/90 |
| 6,088,095 | A | | 7/2000 | Sharma |
| 6,141,120 | A | * | 10/2000 | Falk ............................. 358/504 |
| 6,567,171 | B1 | * | 5/2003 | Rushing ....................... 399/49 |
| 6,747,767 | B1 | | 6/2004 | Heuer et al. |
| 7,423,778 | B2 | | 9/2008 | Hersch et al. |
| 7,471,385 | B2 | | 12/2008 | Mestha et al. |
| 7,564,601 | B2 | | 7/2009 | Angal et al. |
| 2002/0165684 | A1 | * | 11/2002 | Olson .............................. 702/85 |
| 2003/0078746 | A1 | * | 4/2003 | Samsoondar ................... 702/66 |
| 2004/0008357 | A1 | * | 1/2004 | Kise .............................. 358/1.9 |
| 2008/0294363 | A1 | * | 11/2008 | Parmar et al. ................... 702/95 |
| 2009/0129801 | A1 | * | 5/2009 | Donaldson ....................... 399/49 |
| 2009/0195797 | A1 | | 8/2009 | Mestha et al. |
| 2011/0282613 | A1 | * | 11/2011 | Skinner et al. ................ 702/104 |

OTHER PUBLICATIONS

Emmel, P., Hersch, R. D. (2000). Colour calibration for colour reproduction. The 2000 IEEE International Symposium on Circuits and Systems (ISCAS), 2000, Geneva. Proceedings, 5, vI05-v108.

Minghui Xia, Saber, E., Sharma, G., Murat Tekalp, A. (1999). End-to-end color printer calibration by total least squares regression. IEEE Transactions on Image Processing, 8(5), 700-7t6.

Dianat, S., Mestha, L.K., Mathew, A. (2006). Dynamic Optimization Algorithm X'or Generating Inverse Printer Map With Reduced Measurements.IEEE International Conference on Acoustics, Speech and Signal Processing (ICASSP 2006 Proceedings), 3,IIIII72-IIII 175.

* cited by examiner

*Primary Examiner* — Kimberly A Williams
(74) *Attorney, Agent, or Firm* — Duft Bornsen & Fettig LLP

(57) ABSTRACT

The systems and methods presented herein provide for the testing of calibration processing within a print controller. In one embodiment, a method provides for testing a printer calibration module. The method includes simulating an optical density response of the printer to generate a plurality of optical density curves for the printer and determining spectral reflectance values for corresponding optical density values in the optical density curves. The method also includes processing the spectral reflectance values via the printer calibration module to generate a calibration output. The method also includes analyzing the calibration output to determine accuracy of the printer calibration module.

18 Claims, 11 Drawing Sheets

TESTING PRINTER CALIBRATION

FIELD OF THE INVENTION

The invention relates to the field of calibrating printing systems.

BACKGROUND

Production printing systems associated with data processing enterprises generally include a localized print controller within the printing system. The print controller controls the overall operation of the printing system including, for example, host interfacing, interpretation or rendering, and lower level process control or interface features of print engines. Host interaction may include appropriate adapters for coupling the printing system to one or more host systems that transmit print jobs to the printing system. The print jobs are generally encoded in the form of a page description language such as PostScript (PS), PCL, IPDS, etc.

In whatever form the print job may be encoded or formatted, the print controller within the printing system interprets the received information to generate sheetside bitmaps of the print job. The sheetside bitmaps represent the image to be printed on one side of a sheet of a print medium. Each sheetside bitmap generally comprises a 2-dimensional array of picture elements ("pixels", or PELs) that represent a corresponding formatted sheet of the print job. Each pixel may represent an encoded color value in accordance with the requirements of the particular print job encoding and the capabilities of the printing system on which the print job is to be printed.

The print controller stores or buffers the sheetside bitmaps in accordance with storage capabilities of the particular architecture of a particular print controller. The print controller then forwards the sheetside bitmaps to one or more printers (sometimes also referred to as a "print engine", "imaging engine" or a "marking engine"). The printers have internal queues for storing the sheetside bitmaps to be printed. The printer pulls the sheetside bitmaps off the queue and performs an imaging process to mark the print medium with the sheetside bitmaps provided by the print controller. The printer may be a laser printer, an ink-jet printer, or another type of imaging system that transfers each sheetside bitmap to corresponding pixels on paper. Generally, the printer is configured with the printing system.

Output quality for printing systems generally depends on the printer characteristics being known and fixed, so that the color conversions and transfer curves can be constructed in advance. This known state may be referred to as the reference state. In practice, printers tend to become uncalibrated due to environmental conditions and operating conditions. This "printer drift" degrades the output quality of a printed product because the amount of deposited toner or ink varies. And, printer drift is generally impossible to model or predict because it depends on too many factors, both external and internal (e.g., temperature, humidity, printer age, etc.).

Printer drift has usually been solved by periodically recalibrating the printer. Printer calibration involves printing a set of test patches where the output is known assuming that the printer is in the reference state. The printed patches are then measured such that a calibration module may compare the measured patches to known values of the reference state of the printer to determine whether the printer has drifted (i.e., has become uncalibrated). The calibration module then uses this model to adjust the transfer curves (e.g., color conversion models) such that subsequent output can be corrected to that of the printer in the reference state. However, no system presently exists to determine whether the calibration module itself is functioning properly. For example, the calibration module may incorrectly process the measured patches such that the calibration module improperly recalibrates the printer. Such may be due to the improper installation of a calibration algorithm within the calibration module and/or malfunctioning circuitry within the print controller.

In any case, testing a calibration module generally requires large amounts of data to statistically ensure that the calibration algorithms are functioning properly. To generate such data, a printing system would be required to print a large quantity of test patches on physical print medium, resulting in increased manual intervention and a waste of supplies.

SUMMARY

Embodiments herein provide for the testing of calibration processing within a print controller. In one embodiment, a method provides for testing a printer calibration module. The method includes simulating an optical density response of the printer to generate a plurality of optical density curves for the printer and determining spectral reflectance values for corresponding optical density values in the optical density curves. The method also includes processing the spectral reflectance values to generate a calibration output. The method also includes analyzing the calibration output to determine accuracy of the printer calibration module.

In one embodiment, the printer is a CMYK printer. In this regard, the method may include modeling spectral reflectance for the CMYK printer and inverting the spectral reflectance model to determine the spectral reflectance value for each corresponding optical density value. Inverting the spectral reflectance model may include performing a non-linear optimization on the spectral reflectance model to invert the spectral reflectance model. Simulating an optical density response of the printer may include determining a range of optical density tolerances for each value of the optical density curves. For example, the method may further include randomly generating the optical density values within the optical density tolerances to provide a reference for the corresponding spectral reflectance. Thus, when optical density values are randomly generated outside the tolerance ranges to test the calibration of the printing system, the resultant spectral reflectance may be compared to the reference to determine whether the operation is functioning properly. Analyzing the calibration output may include comparing the calibration output to a reference file that includes calibration tolerance information for determining whether the calibration output is acceptable.

The various embodiments disclosed herein may be implemented in a variety of ways as a matter of design choice. For example, the embodiments may be used with other density spaces (e.g., Status A, Status T) and/or other optical densities. Additionally, the embodiments may take the form of hardware, software, firmware, or combinations thereof. For example, a calibration module and the components that are used to ensure that the calibration module is functioning properly may be configured as a software module within or external to a print controller of the printing system to operate in the manner described above. In another embodiment, a computer readable medium is operable to store software instructions for testing the calibration module. These software instructions are configured so as to direct the printing system or some other processing system to operate in the manner described above.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
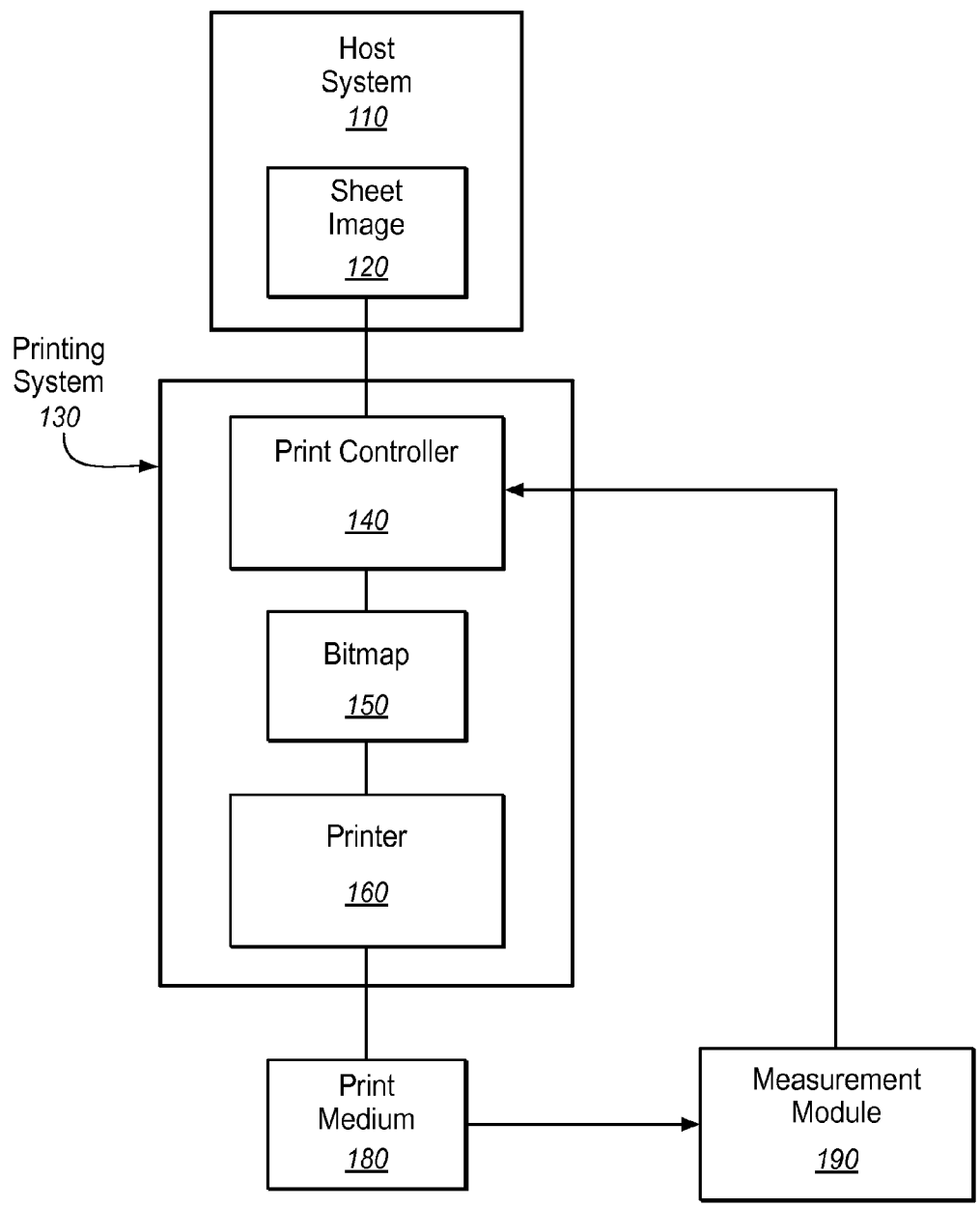
FIG. 1 is a block diagram of an exemplary printing system.

FIG. 1 is a block diagram illustrating an exemplary printing system 130. A host system 110 is in communication with the printing system 130 to print a sheet image 120 onto a print medium 180 (e.g., paper) via a printer 160. The resulting print medium 180 may be printed in color (e.g., Cyan, Magenta, Yellow, and blacK, or CMYK) and/or in any of a number of gray shades, including black and white. The host system 110 may comprise any computing device, such as a personal computer, a server, or even a digital imaging device, such as a digital camera or a scanner. The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160. The printing system 130 may be a high-speed printing system operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. The printing system 130 may also include a measurement module 190 that is used in the calibration of the printing system 130. For example, the measurement module 190 may scan and measure colors on the print medium 180. The print controller 140 may then process these measured colors to calibrate the printing system 130 accordingly.

Figure 2:
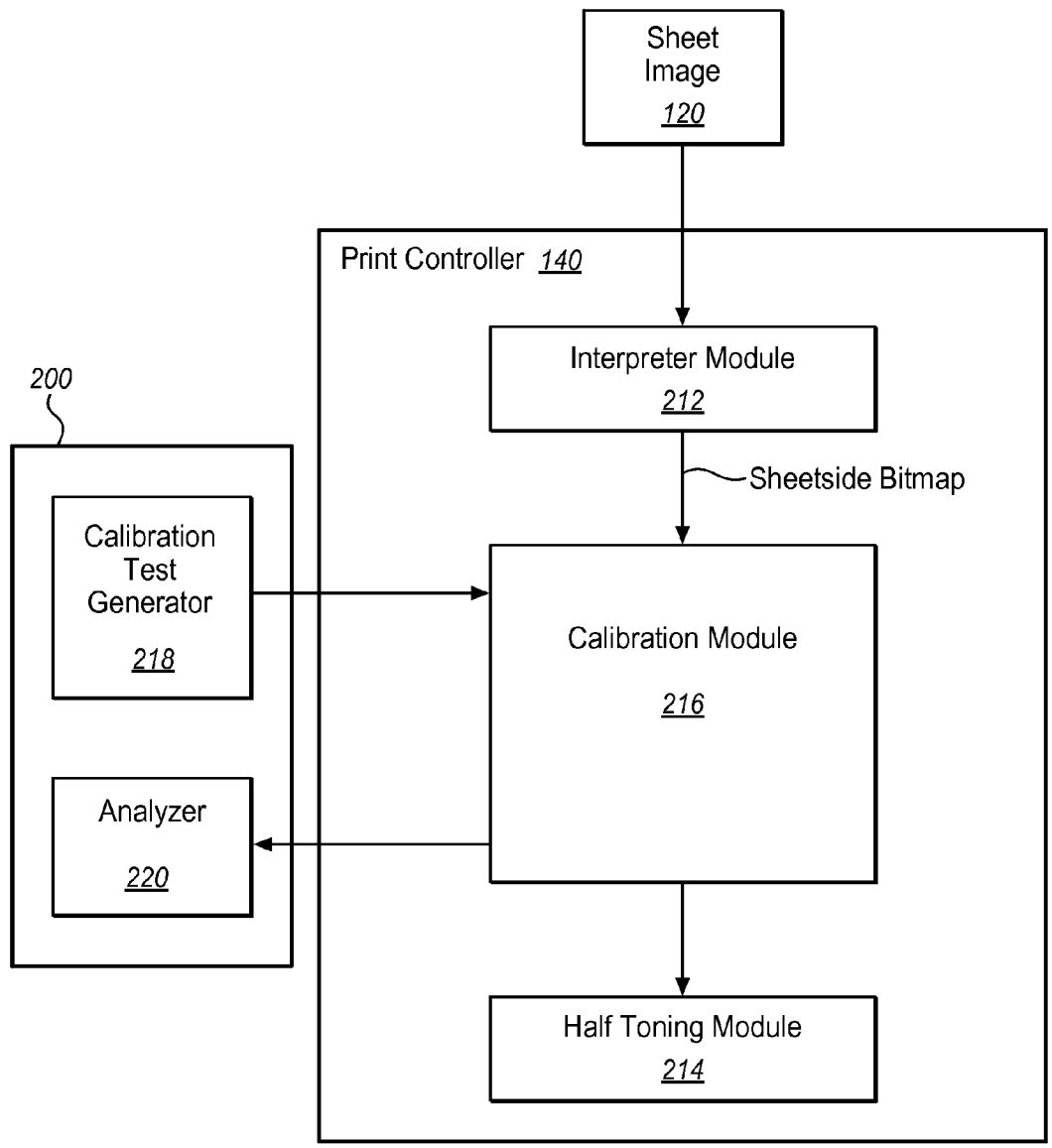
FIG. 2 is a block diagram of an exemplary print controller.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. FIG. 2 is a block diagram illustrating the exemplary print controller 140. The print controller 140, in its generalized form, includes an interpreter module 212, a halftoning module 214, and a calibration module 216. These separate components may represent hardware used to implement the print controller 140. Alternatively or additionally, the separate components may represent logical blocks implemented by executing software instructions in a processor of the print controller 140. Accordingly, the invention is not intended to be limited to any particular implementation as such may be a matter of design choice.

The interpreter module 212 is operable to interpret, render, rasterize, or otherwise convert images (i.e., raw sheetside images such as sheet image 120) of a print job into sheetside bitmaps. The sheetside bitmaps generated by the interpreter module 212 are each a 2-dimensional array of pixels representing an image of the print job (i.e., a CTI), also referred to as full sheetside bitmaps. The 2-dimensional pixel arrays are considered "full" sheetside bitmaps because the bitmaps include the entire set of pixels for the image. The interpreter module 212 is operable to interpret or render multiple raw sheetsides concurrently so that the rate of rendering substantially matches the rate of imaging of production print engines.

The halftoning module 214 is operable to represent the sheetside bitmaps as halftone patterns of toner. For example, the halftoning module 214 may convert the pixels to halftone patterns of CMYK toner for application to the paper. Once computed, the halftoning module 214 transfers the converted sheetside bitmaps to the printer 160 to apply the toner to the paper. The print controller 140 may also include other modules such as a print job storage system, a raw data preprocessing system, and a bitmap processing system, etc.

The calibration module 216 comprises hardware, software, firmware, or any combination thereof, that is operable to calibrate the printer 160. To assist in the calibration, the measurement module 190 may be used to detect colors printed to the print medium 180. For example, the measurement module 190 may include an optical densitometer or a spectrophotometer that detects colors on the print medium 180 and converts the detected colors to a detected color characterization for use in calibrating the printer 160.

However, as previously mentioned, no system existed to test whether the calibration module 216 itself is functioning properly. To implement testing of the calibration module 216, a system 200 including a calibration test generator 218 and an analyzer 220 is provided. The calibration test generator 218 comprises hardware, software, firmware, or any combination thereof that is operable to generate relatively large amounts of data for processing by the calibration module 216. The analyzer 220 comprises hardware, software, firmware or any combination thereof for the purposes of determining whether the calibration module 216 is functioning properly after processing the large amounts of data from the calibration test generator 218. The calibration test generator 218 and/or the analyzer 220 may be configured within the print controller 140 or external thereto. For example, the calibration test generator 218 and the analyzer 220 may be software modules within an external computer that interfaces to the print controller 140 to test the calibration algorithms of the calibration module 216.

Figure 3:
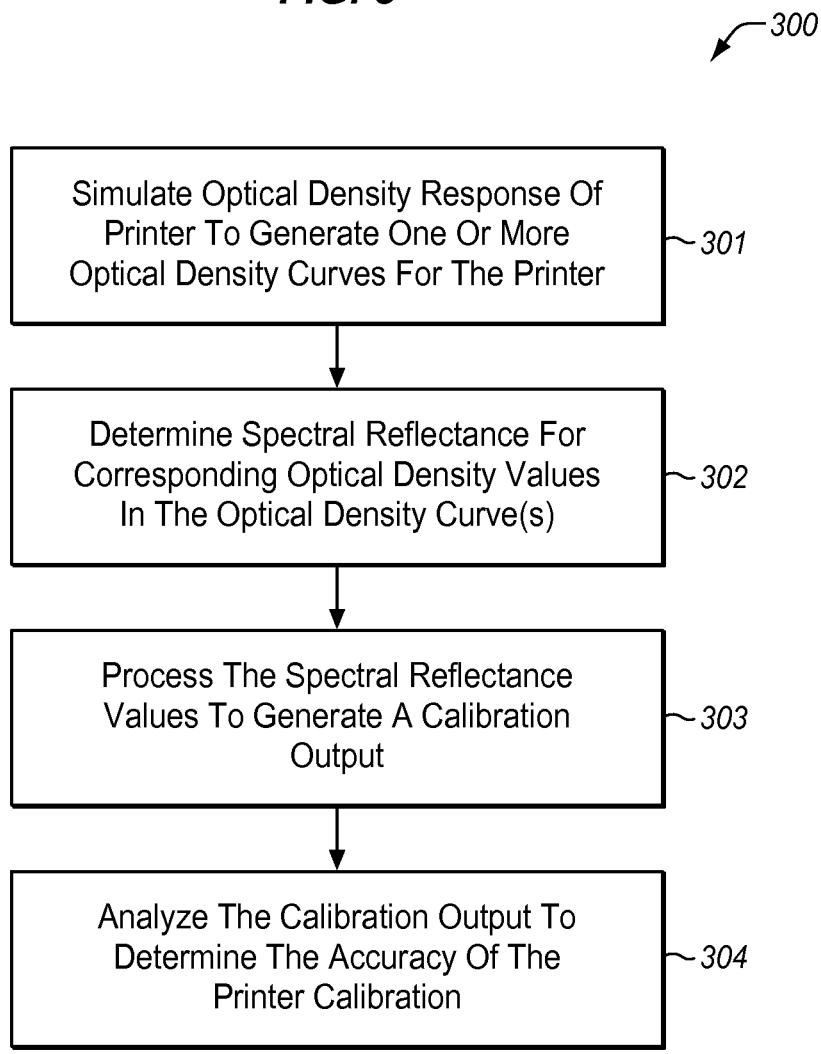
FIG. 3 is a flow chart illustrating an exemplary process of testing printer calibration.
Figure 4:
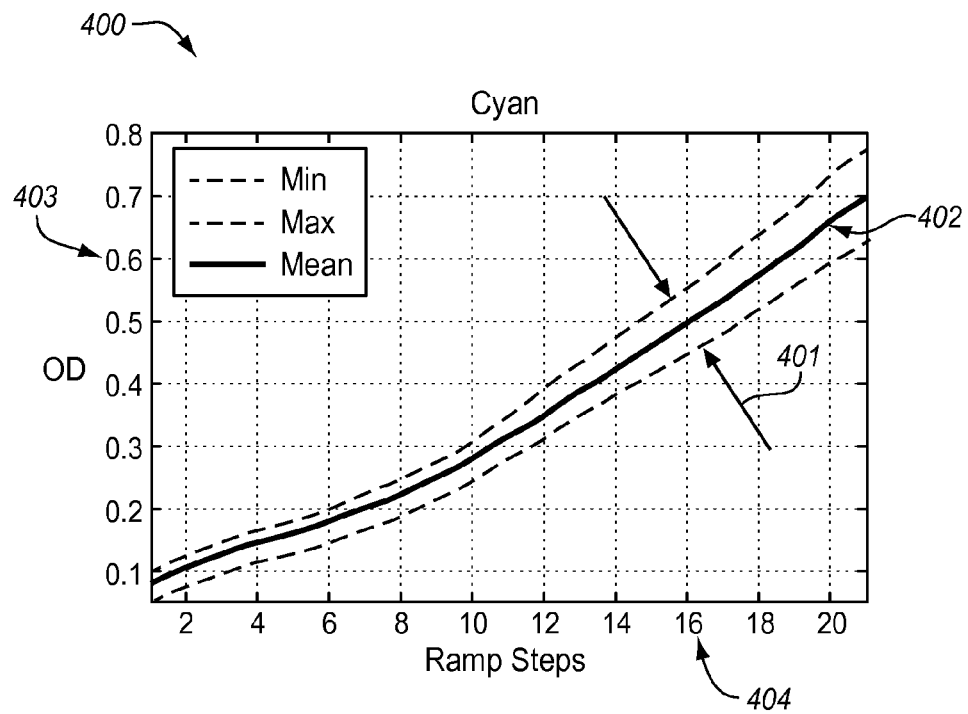
FIGS. 4-7 are exemplary graphs of CMYK optical density tolerances based on heuristic optical density measurements.
Figure 5:
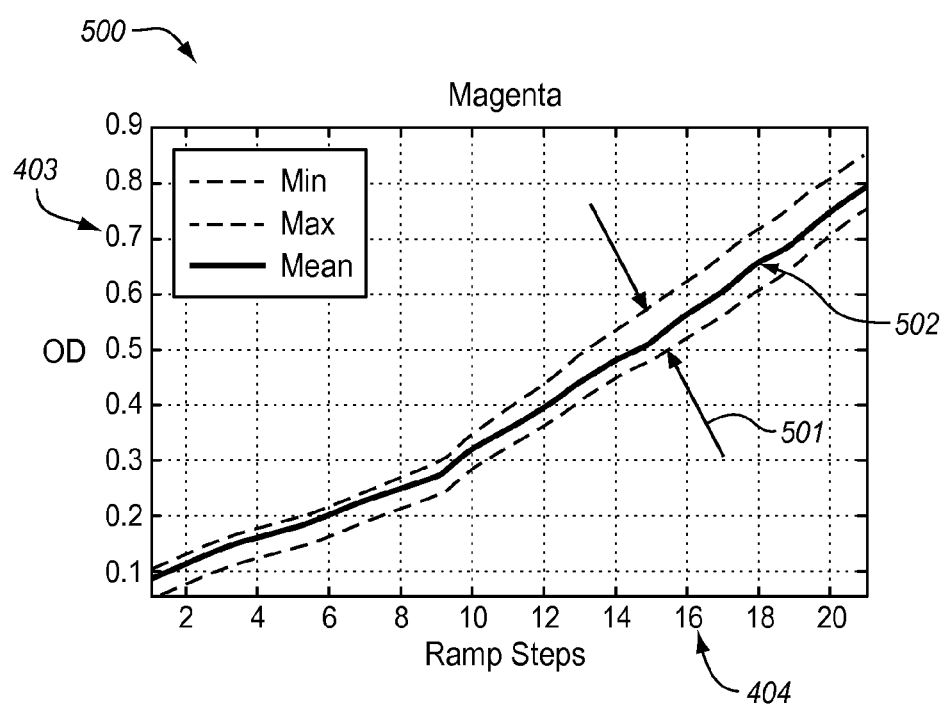
Figure 6:
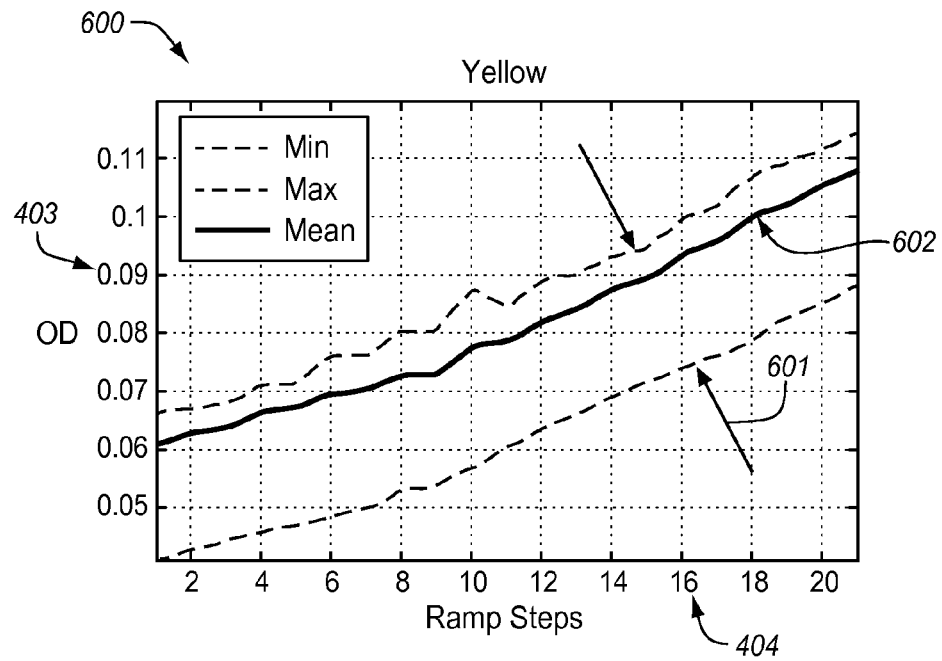
Figure 7:
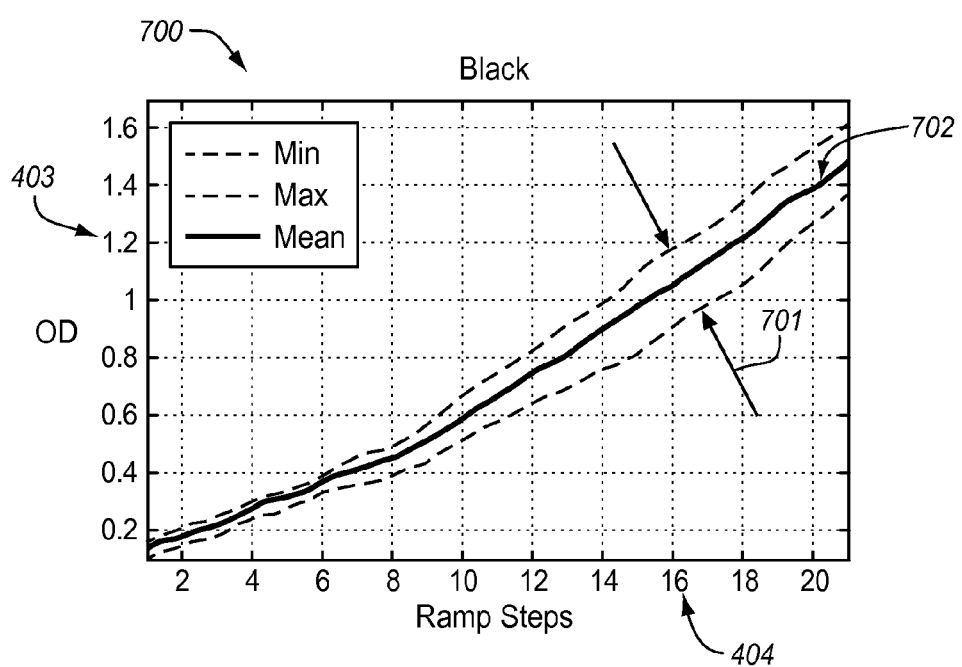
Figure 8:
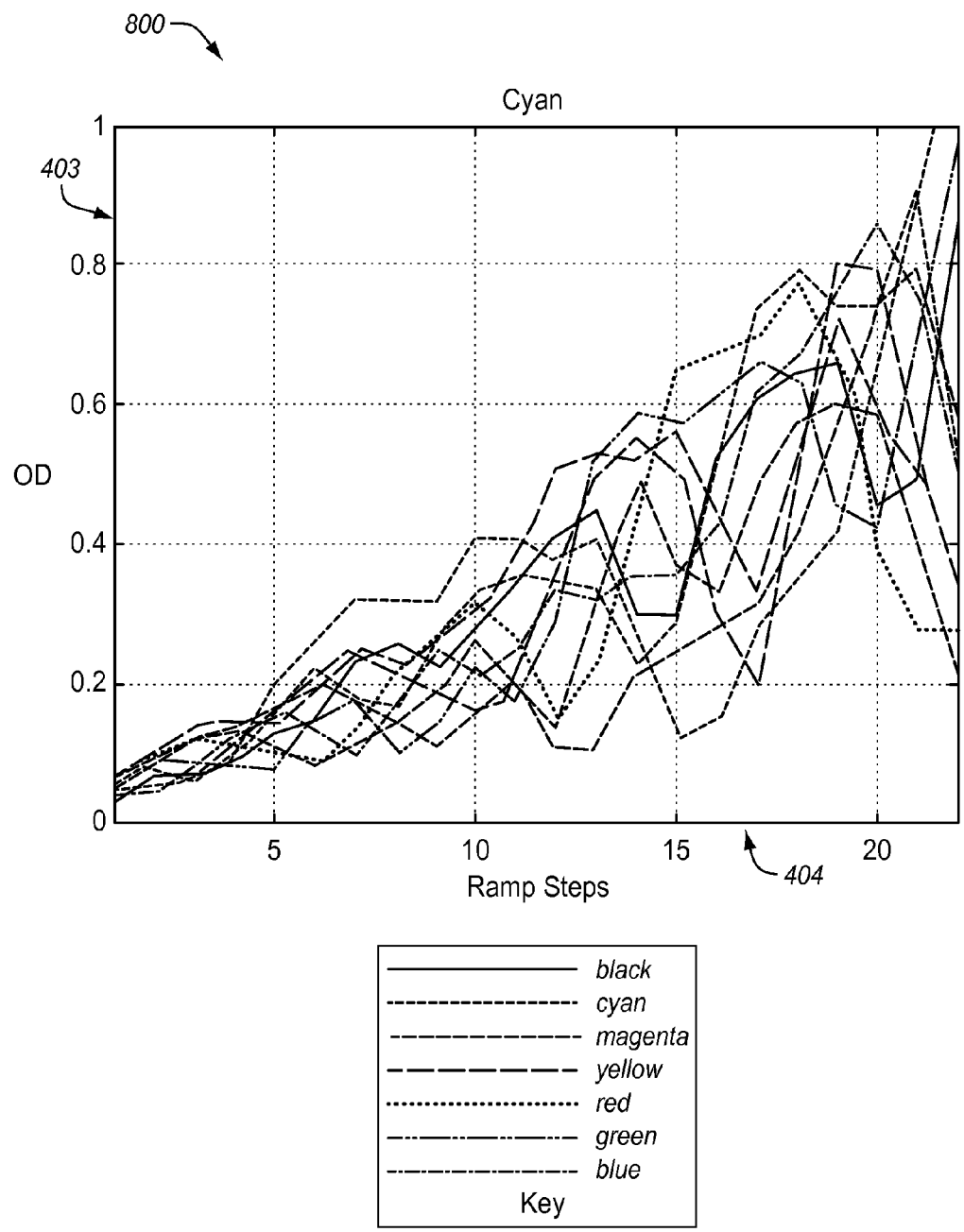
FIGS. 8-11 are exemplary graphs of randomly generated optical density values generated within the CMYK optical density tolerances of FIGS. 4-7.
Figure 9:
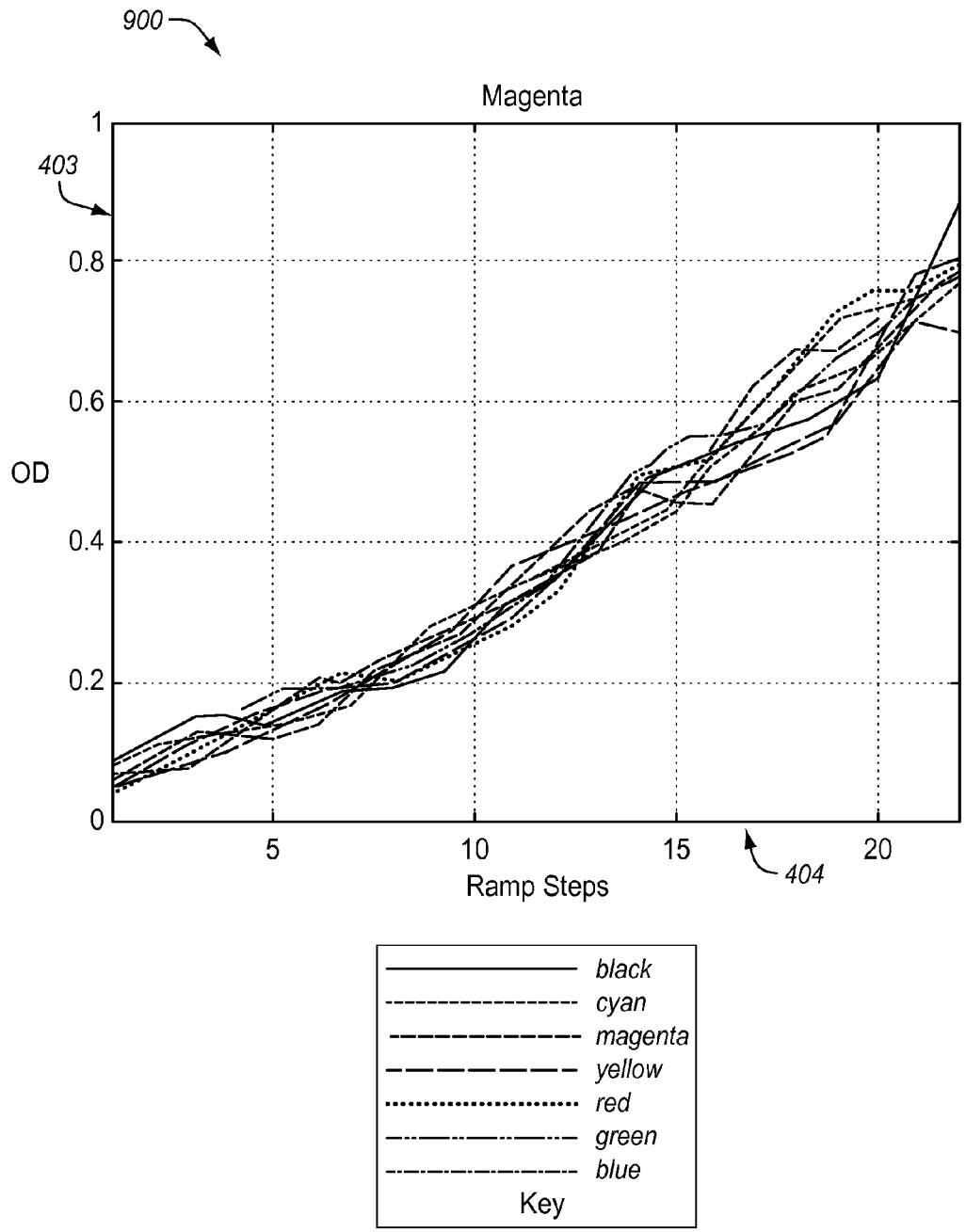
Figure 10:
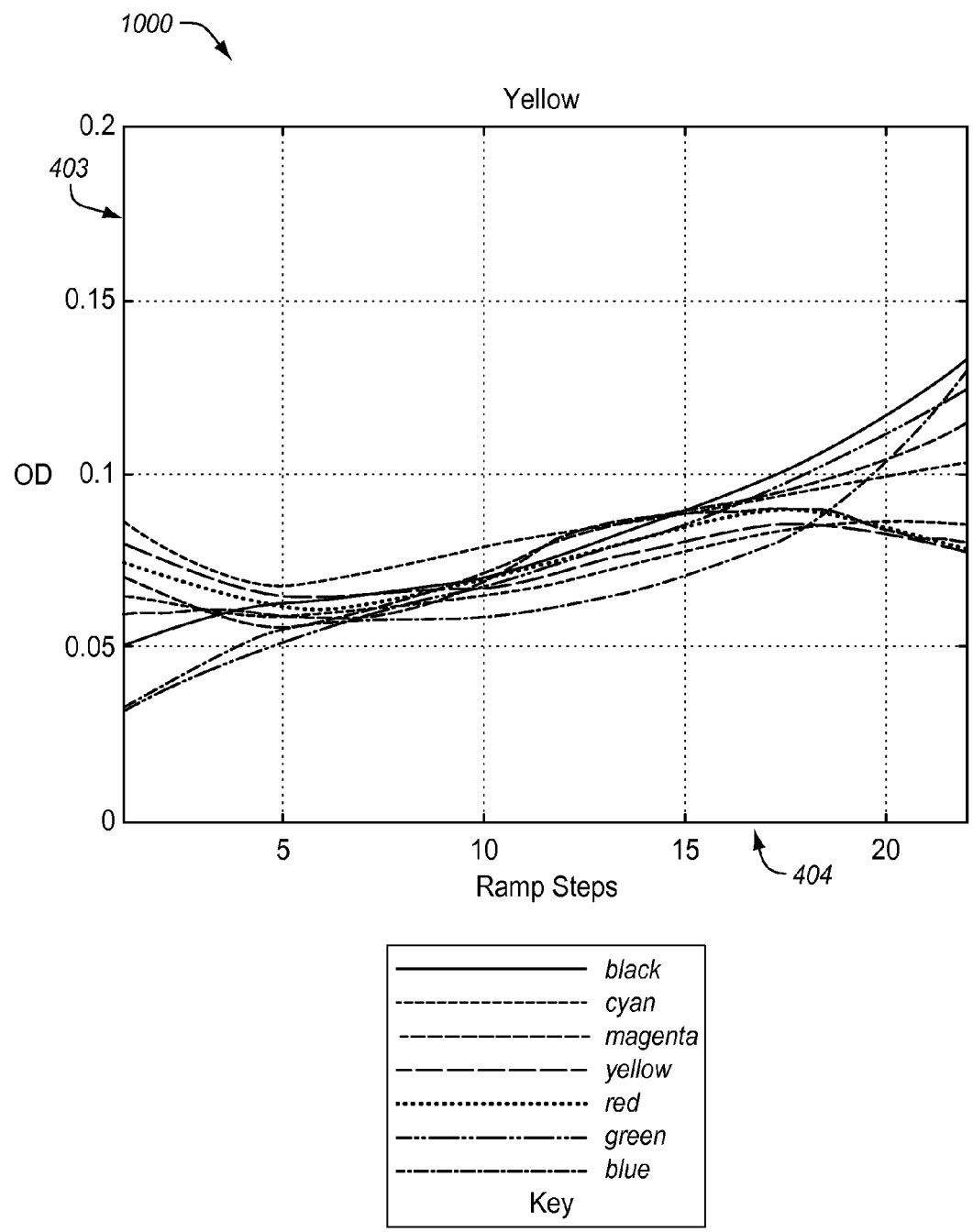
Figure 11:
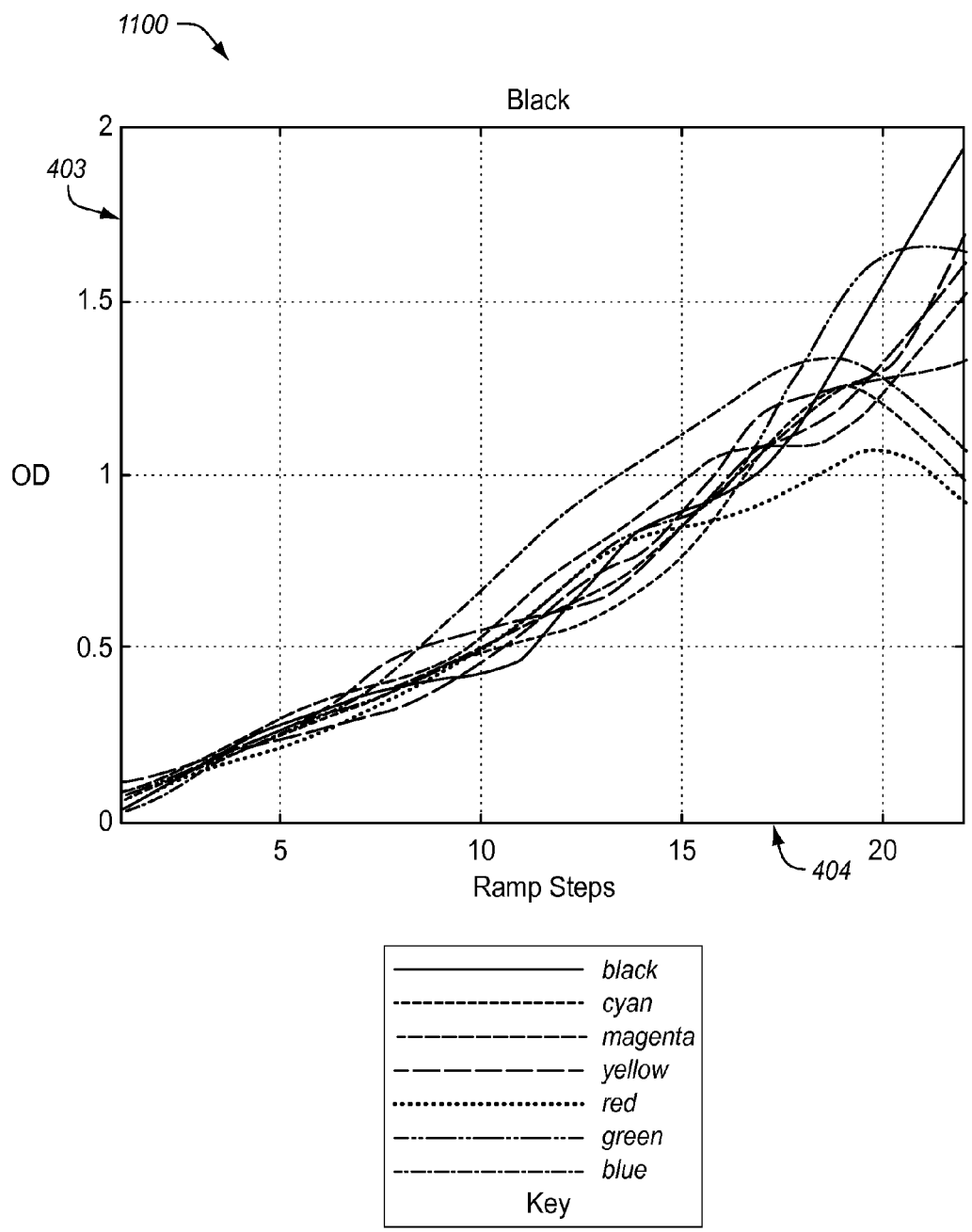

FIG. 3 is a flow chart illustrating one exemplary process 300 of testing printer calibration. The process 300 begins in process element 301 when the calibration test generator 218 simulates an optical density response of the printer 160 to generate one or more optical density curves for the printer 160. In this regard, the calibration test generator 218 may determine a range of optical density tolerances for each value of the optical density curves. For example, the printer 160 may be a CMYK printer. The calibration test generator 218 may generate an optical density curve for each channel of the printer 160 based on a heuristic ramp measurements of printers that are similar to the printer 160. The calibration test generator 218 may then determine tolerance ranges for each of these curves as shown in FIGS. 4-7.

FIGS. 4-7 are exemplary graphs of CMYK optical density tolerances based on heuristic optical density measurements. More specifically, graph 400 illustrates the average optical density curve 402 for the C channel (i.e., cyan) as a function of optical density (axis 403) and ramp steps (axis 404) obtained from one or more printers in their reference/calibrated states. The tolerance range 401 about the optical density curve 402 illustrates an acceptable range of optical density drift from the desired optical density curve 402. Similar optical density curves 502, 602, and 702, are plotted in a graphs 500, 600, and 700 for the M (magenta), Y (yellow), and K (black) channels along with their tolerance ranges 501, 601, and 701, respectively.

With the optical density response of the printer 160 simulated, the calibration test generator 218 may determine spectral reflectance values for corresponding optical density values in the optical density curve(s), in the process element 302. For example, the calibration test generator 218 may model the CMYK spectral reflectance for the printer 160. The spectral reflectance model is a curve of the reflectivity as a function of wavelength (i.e., color values). The calibration test generator 218 may then invert the spectral reflectance model to determine a spectral reflectance value that corresponds to an optical density value in each of the CMYK optical density curves 402, 502, 602, and 702. Such may be performed by performing a non-linear optimization on the spectral reflectance model to invert the spectral reflectance model.

With the spectral reflectance values determined, the calibration test generator 218 may transfer the spectral reflectance values to the calibration module 216 (e.g., as a text file) such that the calibration module 216 may process the spectral reflectance values and generate a calibration output, in the process element 303. To more rigorously test the calibration algorithm of the calibration module 216, however, the calibration test generator 218 may randomly generate optical density values outside the tolerance ranges 401, 501, 601, and 701 of each of the CMYK optical density curves 402, 502, 602, and 702, as exemplarily shown in graphs 800, 900, 1000, and 1100 of FIGS. 8, 9, 10, and 11. For example, the calibration test generator 218 may randomly generate optical density values (e.g., using a Monte Carlo algorithm) such that certain optical density values fall outside the desired tolerance ranges 401, 501, 601, and 701 of optical density. The calibration test generator 218, therefore, may generate spectral reflectances that also fall outside the desired tolerances of the printer 160 such that the output from the calibration module 260 may be analyzed to determine whether the calibration module 216 is functioning properly.

The analyzer 220 is operable to analyze the calibration output to determine the accuracy of the calibration module 216. For example, once the calibration module 216 processes spectral reflectance values generated from the randomly generated optical density values, the calibration module 216 may generate an optical density curve to calibrate the printer 160. The analyzer 220 may, in turn, compare the generated optical density curve (i.e., the output of the calibration module 216) to a reference file to determine whether the generated optical density curve is within acceptable tolerances. This reference file may include optical density curves that have been confirmed as mathematically accurate based on the input to the calibration module 216. Alternatively, the analyzer 220 may compare the output of the calibration module 216 to that of a verified calibration algorithm processing the same input information from the calibration test generator 218.

Figure 12:
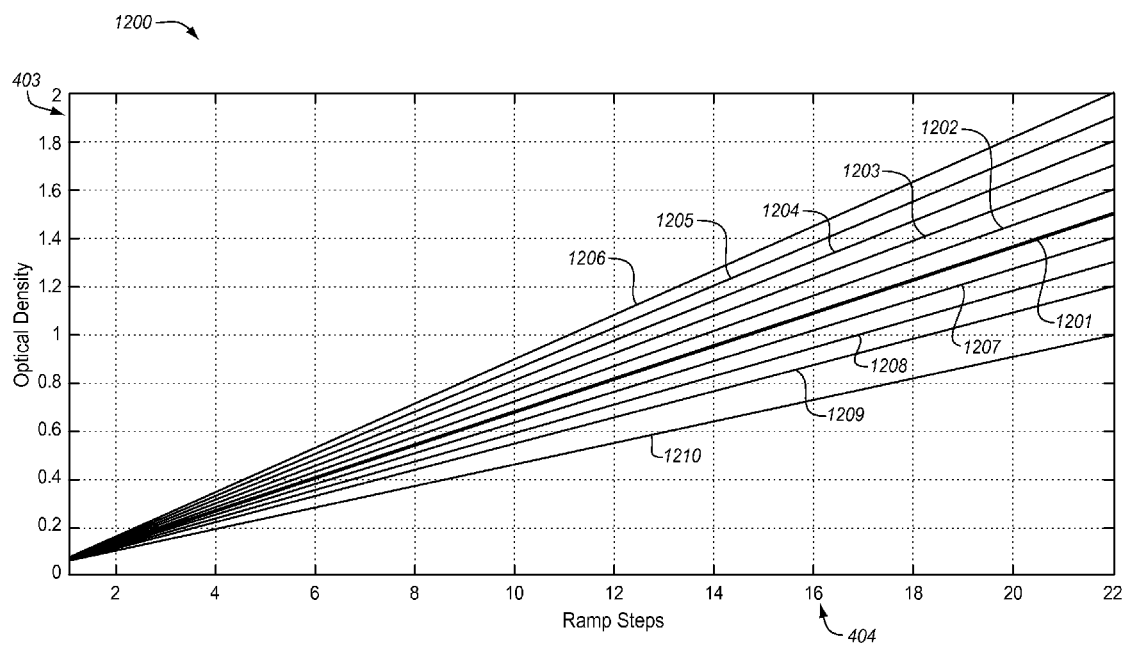
FIG. 12 is an exemplary graph of optical density curves that differ by slope.

FIG. 12 is an exemplary graph of optical density curves that differ by slope. These curves provide an alternative means for testing the calibration module 216. For example, assume that the target density for black is 1.5 (i.e., line 1201) and that a reference curve maximum optical density is also 1.5. Since the optical densities are equal, the calibration module 216 should not change the optical density response of the printer and should produce a response similar to the line 1201 upon testing if the calibration module 216 is functioning properly.

By creating straight optical density lines, generating the associated spectral reflectances, and systematically processing the spectral reflectances through the calibration module 216, performance of the calibration module 216 may be more discretely examined. For example, the lines 1202-1210 and their associated the spectral reflectances may also be processed using the same target reference curve density of 1.5 to determine how the calibration algorithm responds to values that differ from reference curve, and how it attempts to reproduce the lines 1202-1210. If one or more of the lines are not reproduced or significantly differ from the target optical density response, the analyzer 220 may determine where exactly it is that the calibration module 216 is failing.

Figure 13:
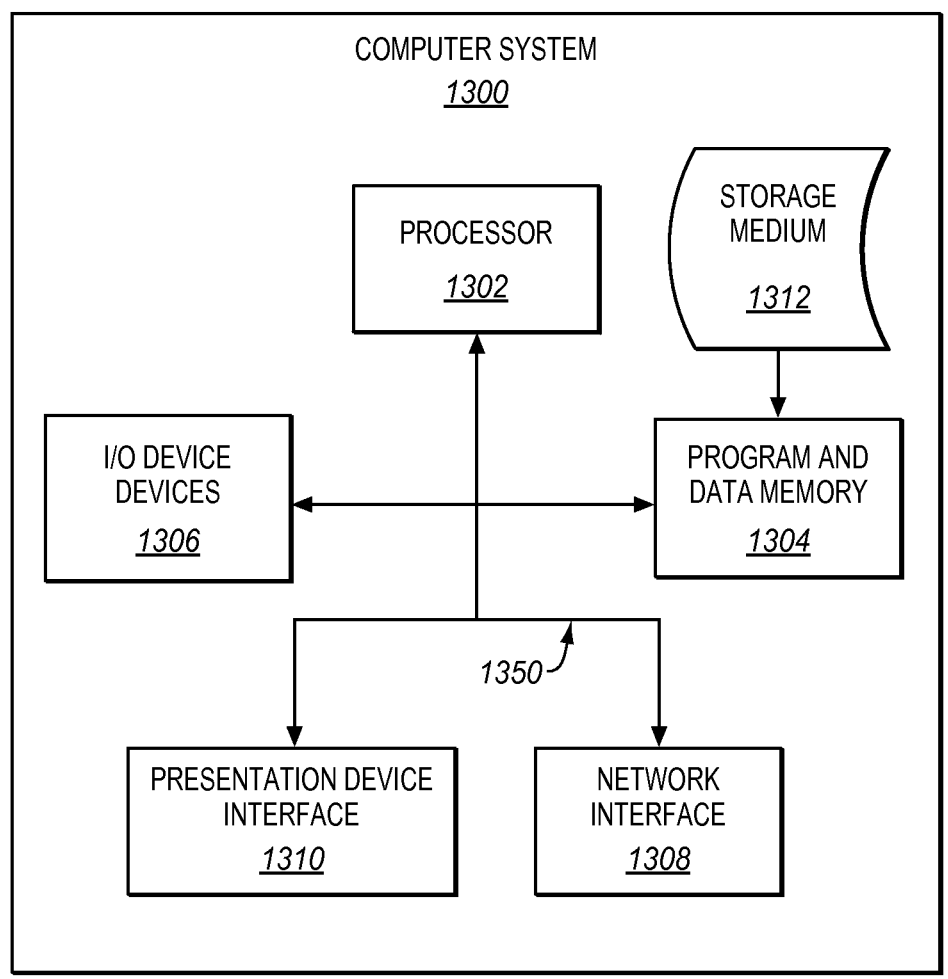
FIG. 13 illustrates an exemplary computer system operable to execute computer readable medium embodying programmed instructions to perform desired functions.

As mentioned, embodiments disclosed herein can take the form of software, hardware, firmware, or various combinations thereof. In one particular embodiment, software is used to direct a processing system of the print controller 140 to perform the various operations disclosed herein. FIG. 13 is a block diagram depicting a processing system 1300 also operable to provide the above features by executing programmed instructions and accessing data stored on a computer readable storage medium 1312. In this regard, embodiments of the invention can take the form of a computer program accessible via the computer-readable medium 1312 providing program code for use by a computer or any other instruction execution system. For the purposes of this description, a computer readable storage medium 1312 can be anything that can contain, store, communicate, or transport the program for use by the computer.

The computer readable storage medium 1312 can be an electronic, magnetic, optical, electromagnetic, infrared, or semiconductor device. Examples of the computer readable storage medium 1312 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 1300, being suitable for storing and/or executing the program code, includes at least one processor 1302 coupled to memory elements 1304 through a system bus 1350. The memory elements 1304 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1306 (including but not limited to keyboards, displays, pointing devices, etc) can be coupled to the system either directly or through intervening I/O controllers. Network adapter interfaces 1308 may also be coupled to the system to enable the computer system 1300 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 1310 may be coupled to the system to interface to one or more presentation devices, such as printing systems and displays for presentation of presentation data generated by processor 1302.

Although claimed and described with respect to a print controller, such designations are merely intended to describe the general testing of calibration of a print controller. Accordingly, while specific embodiments are described herein, the scope of the invention is not limited to those specific embodiments. The scope of the invention is defined by the following claims and any equivalents thereof.

I claim:

1. A method of testing a printer calibration module in a print controller, the method comprising:
    simulating an optical density response of a printer to generate a plurality of optical density curves for the printer;
    determining spectral reflectance values for corresponding optical density values in the optical density curves;
    processing the spectral reflectance values via the printer calibration module to generate a calibration output; and
    analyzing the calibration output to determine accuracy of the printer calibration module.

2. The method of claim 1, wherein the printer is a CMYK printer and wherein the method further comprises:
    modeling spectral reflectance for the CMYK printer; and
    inverting the spectral reflectance model to determine the spectral reflectance value for each corresponding optical density value.

3. The method of claim 2, wherein inverting the spectral reflectance model includes performing a non-linear optimization on the spectral reflectance model to invert the spectral reflectance model.

4. The method of claim 1, wherein simulating an optical density response of the printer comprises determining a range of optical density tolerances for each value of the optical density curves.

5. The method of claim 4, wherein the method further comprises randomly generating the optical density values outside the optical density tolerances to provide a reference for the corresponding spectral reflectance.

6. The method of claim 1, wherein analyzing the calibration output comprises comparing the calibration output to a reference file that includes calibration tolerance information for determining whether the calibration output is acceptable.

7. A system for testing a printer calibration module of a print controller, the system comprising:
    a calibration test generator operable to simulate an optical density response of a printer, generate a plurality of optical density curves for the printer, and determine spectral reflectance values for corresponding optical density values in the optical density curves for processing by the printer calibration module to generate a calibration output; and
    an analyzer operable to analyze the calibration output to determine accuracy of the printer calibration module.

8. The system of claim 7, wherein the printer is a CMYK printer and wherein the calibration test generator is further operable to model spectral reflectance for the CMYK printer and invert the spectral reflectance model to determine the spectral reflectance value for each corresponding optical density value.

9. The system of claim 8, wherein the calibration test generator is further operable to perform a non-linear optimization on the spectral reflectance model to invert the spectral reflectance model.

10. The system of claim 7, wherein the calibration test generator is further operable to determine a range of optical density tolerances for each value of the optical density curves to simulate the optical density response of the printer.

11. The system of claim 10, wherein the calibration test generator is further operable to randomly generate the optical density values outside the optical density tolerances to provide a reference for the corresponding spectral reflectance.

12. The system of claim 7, wherein the analyzer is further operable to compare the calibration output to a reference file that includes calibration tolerance information to determine whether the calibration output is acceptable.

13. A non-transitory computer readable medium comprising software instructions that, when executed on a processor, are operable to direct the processor to test a printer calibration module of a printing system, the software instructions being further operable to direct the processor to:
    simulate an optical density response of the printer to generate a plurality of optical density curves for a printer of the printing system;
    determine spectral reflectance values for corresponding optical density values in the optical density curves;
    process the spectral reflectance values via the printer calibration module to generate a calibration output; and
    analyze the calibration output to determine accuracy of the printer calibration module.

14. The computer readable medium of claim 13, wherein the printer is a CMYK printer and wherein the software instructions are further operable to direct the processor to:
    model spectral reflectance for the CMYK printer; and
    invert the spectral reflectance model to determine the spectral reflectance value for each corresponding optical density value.

15. The computer readable medium of claim 14, wherein the software instructions are further operable to direct the processor to perform a non-linear optimization on the spectral reflectance model to invert the spectral reflectance model.

16. The computer readable medium of claim 13, wherein the software instructions are further operable to direct the processor to determine a range of optical density tolerances for each value of the optical density curves to simulate an optical density response of the printer.

17. The computer readable medium of claim 16, wherein the software instructions are further operable to direct the processor to randomly generate the optical density values outside the optical density tolerances to provide a reference for the corresponding spectral reflectance.

18. The computer readable medium of claim 13, wherein the software instructions are further operable to direct the processor to compare the calibration output to a reference file that includes calibration tolerance information for determining whether the calibration output is acceptable to analyze the calibration output.

* * * * *